Oct. 1, 1963  R. K. LEARMONT ETAL  3,105,716
INTERNAL REINFORCED CONSTRUCTION OF TRAILERS
Filed May 1, 1961
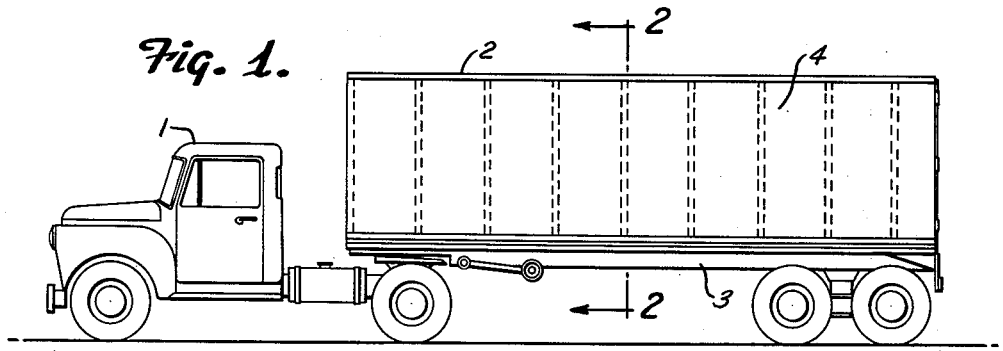
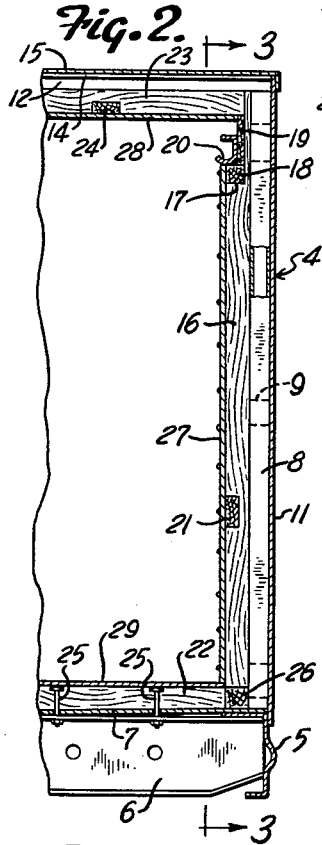
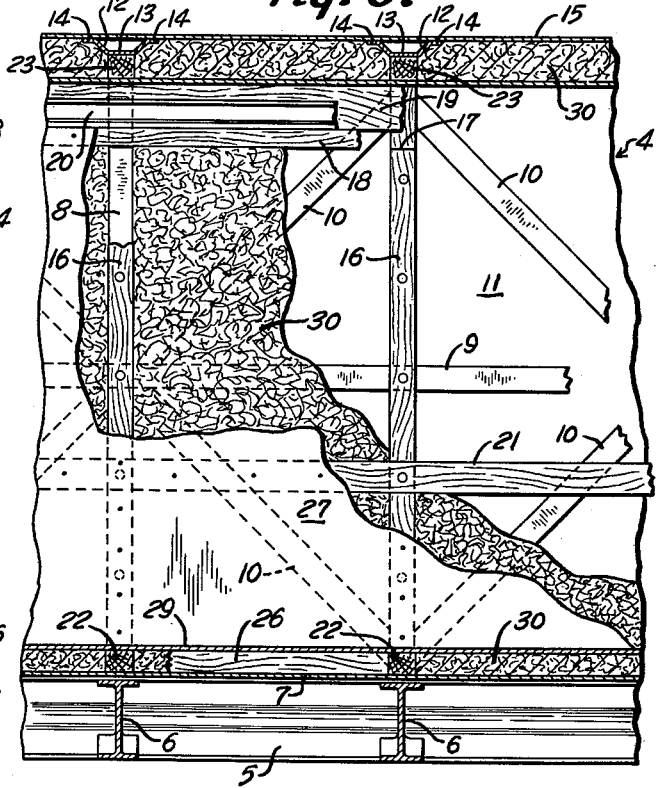
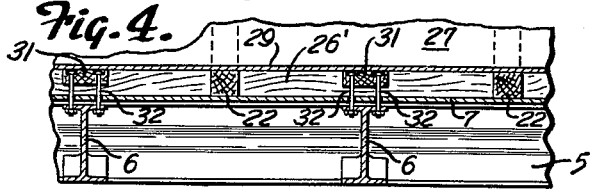
INVENTORS.
Robert K. Learmont
BY Joseph J. Woods
Andrus & Starke
Attorneys

United States Patent Office 3,105,716
Patented Oct. 1, 1963

3,105,716
INTERNAL REINFORCED CONSTRUCTION OF TRAILERS
Robert K. Learmont, 11230 W. Upham Ave., Hales Corners, Wis., and Joseph J. Woods, 2647 N. Wahl Ave., Milwaukee, Wis.
Filed May 1, 1961, Ser. No. 106,817
2 Claims. (Cl. 296—28)

This invention relates to an internal reinforced construction for a trailer body and more particularly to a reinforced wall construction having increased strength and load distributing properties.

In a commercial trailer the side walls and ceiling are generally formed with an inner framework which is covered by facings or skins applied to the inner and outer surfaces of the framework. Generally the walls and ceiling of the conventional trailer are not load bearing members and merely serve as an enclosure for the contents of the trailer with the load being supported upon the floor.

The present invention is directed to a trailer body construction having increased strength and load distributing properties and is particularly adaptable for use with trailers incorporating load supporting carriages or other devices which impart concentrated loads to the walls or ceiling of the trailer. More specifically, the trailer of the invention includes a pair of side rails which are connected together by a series of cross beams. A base floor is supported on the cross beams and a series of vertical studs are supported on the floor above the side rails. The upper ends of each corresponding pair of studs are connected together by ceiling support members and the studs and ceiling support members constitute an outer frame for the trailer which is covered with a suitable outer facing or skin.

In addition to the outer frame, a second series of studs are attached to the inner surface of the outer studs and the upper and lower ends of each corresponding pair of second studs are connected together by a ceiling beam and a floor beam respectively. The inner studs, ceiling beams and floor beams provide a series of generally rectangular inner frame members which are spaced throughout the length of the trailer. The inner frame members are tied together by a series of longitudinal braces to thereby provide an inner frame for the trailer. A suitable facing or skin is applied to the inner surface of the inner frame to provide a smooth interior surface for the trailer.

In this construction, which includes separate outer frame and inner frame structures, a support track or other load member can be applied to the walls or ceiling and the load will be distributed throughout the entire inner frame. In addition to distributing a load, the inner frame will also distribute the fore and aft thrust to which the trailer is subjected during the braking and acceleration of the tractor-trailer.

The use of the outer frame and the integral inner frame provides an increased wall depth for insulation which reduces the transfer of heat between the exterior and the interior of the trailer.

Other objects and advantages will appear in the course of the following description.

The drawings illustrate the best mode presently contemplated of carrying out the invention.

In the drawings:
FIGURE 1 is a side elevation of a tractor-trailer incorporating the wall construction of the invention;
FIG. 2 is a fragmentary transverse section taken along line 2—2 of FIG. 1;
FIG. 3 is a longitudinal section taken through the trailer and showing a side wall with parts broken away in section; and
FIG. 4 is a fragmentary longitudinal section showing the lower portion of the side wall of the trailer body of a modified form of the invention.

FIGURE 1 illustrates a tractor 1 which is connected to and hauls a trailer 2. The trailer 2 comprises a frame 3 which supports a body 4.

As best shown in FIGS. 2 and 3, the trailer body 4 comprises a pair of longitudinal side rails 5 which are connected together by a series of cross beams 6. The ends of the cross beams 6 are welded to the vertical web of the side rails 5 and the cross beams are mounted on and secured to the frame 3 of the trailer. A floor 7, which may be made of sheet metal, wood or the like, is secured to the upper flanges of the cross beam 6.

The side walls of the trailer body 4 include a series of spaced vertical studs 8 which are supported on the floor 7 above the side rails 5 and are aligned with the cross beams 6. As shown in the drawings, the studs 8 are metal and are formed with a box-shape cross section, although studs formed of wood, reinforced plastic or other materials could be employed. The studs 8 are connected together by horizontal beam segments 9 and diagonal brace segments 10. The ends of the beam segments 9 and of the brace segments 10 are welded to the studs 8 to provide an integral outer frame structure.

A suitable outer facing or skin 11 is secured to the outer surfaces of the studs 8, beams 9 and braces 10 and provides a smooth outer surface for the trailer body 4. The facing 11 can be formed of metal, plastic or any other suitable material.

The upper ends of each corresponding pair of vertical studs 8 are connected together by a channel member 12 having a central web portion 13 which rests on the upper ends of the studs 8. The channel member 12 is also provided with a pair of generally horizontal flanges 14 and a ceiling skin or facing 15 is secured to the flanges 14 to provide a smooth outer surface for the ceiling of the trailer.

In addition to the outer frame, the wall construction of the invention also includes a series of vertical studs 16 which are secured to the inner surface of the studs 8. The studs 16 may be formed of wood, plastic or metal and can be secured by screws, bolts or any other convenient manner to the studs 8. The upper end of each stud 16 is notched and provided with a horizontal ledge 17 and a track support member 18 rests on the ledges 17 and is secured to each of the studs 16. In addition to the member 18, an upper board 19 is secured to the upper portions of the studs 16 and serves to tie the studs together.

As best shown in FIG. 2, a track 20 is mounted on the track support member 18 and extends substantially the length of the trailer. This track can support a load-bearing carriage, although the present invention is not limited to the use of such a carriage.

The vertical studs 16 of each side wall are also connected together by a longitudinally extending brace 21 which is secured within aligned recesses in the outer surface of each stud 16. As shown in FIG. 2, the outer surface of the brace 21 is substantially flush with the outer surface of the studs 16. While the drawings illustrate one longitudinal brace 21 being used, additional braces 21 can be employed if desired, for the greater the number of rectangles or smaller boxes formed in the wall, the greater the strength of the wall and the more evenly the load will be distributed.

The lower ends of each corresponding pair of studs 16 are connected together by a floor beam 22 which is secured to the floor 7 while the upper ends of the studs 16 are connected together by ceiling beams 23 which are secured to the channel members 12. As shown in FIG. 2, the ends of the floor beams 22 and ceiling beams 23 bear against the vertical side surfaces of the studs 16 and prevent the ends of the studs 16 from moving laterally of the trailer due to the weight or load applied to the studs 16.

To resist torsional stress in the roof, one or more longitudinal ceiling braces 24 may be secured within aligned recesses in the ceiling beams 23.

The floor beams 22 are secured to the aligned cross beams 6 by bolts 25 which extend through the flanges of the beams. In addition, longitudinal floor braces 26 are secured between the lower ends of the studs 16 in each side wall.

Each pair of studs 16 and the connecting beams 22 and 23 constitute rectangular inner frame members and the inner frame members are tied together at their lower extremities by floor braces 26, intermediate their ends by braces 21 and at their upper extremities by longitudinal members 18, 19 and 24 to provide an integral, rigid frame structure.

To provide a smooth surface for the interior of the trailer, a wall facing 27 is secured to the studs 16 and similarly a ceiling facing 28 and a floor 29 are applied to the ceiling beams and floor beams respectively. The facing materials can be wood, plastic or metal, as in the case of the outer skin 15.

To reduce the heat transfer between the interior of the trailer and the exterior, a layer of insulation 30 is placed between the outer skin 15 and the inner skins 27, 28 and 29 in all areas not occupied by the frame members.

The trailer body construction of the invention includes an outer frame which consists of the studs 8 and the channel members 12, and also includes a series of longitudinally spaced inner frame members which are made up of the studs 16 and beams 22 and 23. The inner frame members are tied together by the longitudinal members 18, 19, 21, 24 and 26 to provide an integral inner boxed frame structure.

While the studs 8 and 16 are shown as vertical, it is contemplated that the studs may be disposed at an angle to the vertical, and similarly the braces 21 and 24 can either be a single continuous member which extends the length of the trailer or the braces can be a series of shorter segments each of which is secured to two or more studs.

FIG. 4 illustrates a modified form of the invention employing the same inner and outer frame structure as the first embodiment. In this case the studs 8 and 16 are located between the beams 6 rather than being in vertical alignment therewith. In this construction cross members 31 are secured within aligned recesses in floor braces 26' and extend transversely of the trailer. The inner frame structure is tied in to the beams 6 by a series of bolts 32 which extend through openings in members 31 and the flanges of beams 6.

The inner and outer frame structures provide a wall construction for the trailer which has increased strength and rigidity. Any load applied to the inner frame is distributed throughout the entire inner frame and is not concentrated at any one location. Similarly, the fore and aft thrust resulting from braking and acceleration of the tractor-trailer again is distributed throughout the entire frame structure and is not concentrated in any one area. As the braking and accelerating thrust is more prevalent at the upper end of the trailer, the upper ends of the studs 16 are connected together with the longitudinal members.

The use of the inner and outer frames increases the depth of insulation between the outer and inner skins and therefore results in less heat transfer between the interior of the trailer and the exterior.

The wall construction of the invention is capable of being installed in other types of trailer construction and is particularly adaptable to the conversion of existing trailers having a single frame structure in the walls and ceiling to the double wall construction. In this situation, the inner facing or skin is removed and the studs 16, beams 22 and 23 and longitudinal members 18, 19 and 21 are secured to the existing frame to provide the dual frame structure of the invention. With this construction, the side walls, ceiling and floor of the inner frame are actually composed of a series of interconnected, rectangular or polygonal segments which provide exceptional strength and rigidity.

Various modes of carrying out the invention are contemplated as being within the scope of the following claims particularly pointing out and distinctly claiming the subject matter which is regarded as the invention.

We claim:

1. A trailer body construction, comprising a floor supporting structure, an outer frame supported on the floor supporting structure and including a pair of side walls and a ceiling connected to the upper ends of the side walls, a series of inner frame members disposed at spaced intervals within the outer frame and connected to the outer frame, each inner frame member including a pair of substantially vertical studs disposed inwardly adjacent the corresponding side walls, each inner frame member also including a ceiling beam and a floor beam with said ceiling beam bearing between the vertical side surfaces of the upper end portions of the studs and the floor beam bearing between the vertical side surfaces of the lower end portions of the studs to provide a rigid inner frame member, each vertical stud having a recess in the inner surface thereof with said recess defining a substantially horizontal ledge, a track supported on the ledges of the studs and extending substantially the length of the trailer and disposed to support a load bearing member, each stud also provided with a second recess in the inner surface thereof located at a level beneath said first recess and the second recesses being in substantial alignment, a brace disposed within the aligned second recesses in the studs and extending substantially the length of the trailer, the outer surface of said brace being substantially flush with the inner surface of said studs, an inner skin connected to the inner frame to provide a smooth interior for the trailer body, and an outer skin connected to the outer surface of the outer frame for providing a smooth exterior surface for the trailer body.

2. A trailer body construction, comprising a floor supporting structure, an outer frame supported on the floor supporting structure and including a pair of side walls and a ceiling connected to the upper ends of the side walls, a series of inner frame members disposed at longitudinally spaced intervals within the outer frame and connected to the outer frame, each inner frame member including a pair of substantially vertical studs disposed inwardly adjacent the corresponding side walls and each inner frame member also including a ceiling beam and a floor beam with said ceiling beam bearing between the vertical side surfaces of the upper end portions of the vertical studs and the floor beam bearing between the vertical side surfaces of the lower end portion of the studs to provide a rigid inner frame member, a track supported on the upper portion of the vertical studs and extending substantially the length of the trailer and disposed to support a load bearing member, an outer skin connected to the outer surface of the outer frame for providing a smooth exterior surface for the trailer body, an inner skin connected to the inner frame to provide a smooth interior for the trailer body, and brace means separate from said inner skin and separate from the outer frame for connecting the vertical studs of the inner frame members together, said brace means being located between the track and said floor beams and extending substantially the length of the trailer.

References Cited in the file of this patent

UNITED STATES PATENTS

| | | |
|---|---|---|
| 168,953 | Acklom | Oct. 19, 1875 |
| 2,050,425 | Dean | Aug. 11, 1936 |
| 2,085,923 | Murphy | July 6, 1937 |
| 2,657,088 | Clement | Oct. 27, 1953 |
| 2,677,246 | Wehby | May 4, 1954 |
| 2,833,588 | Black | May 6, 1958 |
| 2,914,004 | Hopkins | Nov. 24, 1959 |

FOREIGN PATENTS

| | | |
|---|---|---|
| 686,163 | Great Britain | Jan. 21, 1953 |